United States Patent Office 3,354,187

Patented Nov. 21, 1967

3,354,187

BLEACHING DARK-COLORED SULFONATION PRODUCTS

Werner Stein, Erkrath-Unterbach, Otto Koch, Hilden, Rhineland, and Herbert Weiss, Cologne-Deutz, Germany, assignors to Henkel & Cie. G.m.b.H., Dusseldorf-Holthausen, Germany No Drawing. Filed Feb. 23, 1965, Ser. No. 434,683
Claims priority, application Germany, Mar. 9, 1962, H 45,104
16 Claims. (Cl. 260—400)

This application is a continuation-in-part of application Ser. No. 194,997, filed May 15, 1962, and now abandoned.

This invention relates to new and useful improvements in the bleaching of dark-colored sulfonation products. The invention more particularly relates to an improved process for bleaching acid sulfonation products obtained by the sulfonation of fatty acids or their derivatives, such as their esters.

The sulfonation products obtained by sulfonating fatty acids or fatty acid derivatives, such as fatty acid esters, constitute surface-active materials which show resistance against hard water and thus are of interest as detergents and wetting agents. The products conventionally obtained, as for example when effecting the sulfonation with gaseous sulfur trioxide used in excess, are dark-colored products which are not suitable for commercial use.

In co-pending applications, Ser. Nos. 194,988, issued to Patent 3,159,657, and 194,965, issued to Patent 3,142,-691, filed the same day as parent application Ser. No. 194,997 (now abandoned), process are described for converting these dark-colored products to lighter-colored commercially attractive ones by bleaching with hydrogen peroxide added per se or formed in situ or with strongly oxidant, inorganic oxy acids or their salts or anhydrides. The bleaching is preferably effected in the presence of the excess sulfonation agent present in the acid sulfonation product. The processes are particularly applicable to those sulfonation products which have been produced by allowing an excess of gaseous sulfur trioxide, preferably diluted with an inert gas, to act upon the fatty acids or their derivatives. The excess sulfonating agent present in the sulfonation product is able to be converted into sulfuric acid by the addition of water.

One object of this invention is to still further improve the bleaching effect obtained by the above-mentioned processes so as to obtain still lighter products.

Another object of this invention is an improved process for bleaching the $\alpha$-sulfonation products obtained by sulfonating with an excess of $SO_3$, a member of the group consisting of substantially saturated fatty acids, fatty acid esters, and mixtures thereof having a substantially saturated fatty acid radical with 6–28 carbon atoms which is sbstantially free of alcoholic hydroxyl groups and wherein the excess $SO_3$ has been reacted with a higher hydrocarbon compound containing from 10–28 carbon atoms and containing a sulfatizable alcoholic hydroxy group.

These and still further objects will become apparent from the following description:

In accordance with the invention, it has been surprisingly found that the bleaching effect of the above mentioned processes can be substantially improved if, after the bleaching has proceeded to a certain point on the acid products, these products are neutralized and the bleaching is continued after the neutralization.

The acid sulfonation products are preferably initially bleached in a manner described in said applications and after the blue-color value as measured in a Lovibond tintometer, in a 4" cell has been lowered to at least 5, the product is substantially neutralized in the conventional manner and the bleaching continued on the neutralized product until the same is substantially further lightened.

The alpha-sulfonated fatty acids to be processed according to the invention may be derived from any fatty acids having from 6 to 28, and preferably from 8 to 18, carbon atoms, especially from the fatty acids obtained from natural fats of animal, vegetable, fish or other marine origin. By the choice of the starting fats, it is possible to extensively influence the properties of the sulfonates to be manufactured. In this manner, products which are easily soluble, even at low temperatures of, for example 20–45° C., can be obtained from fats which contain preferably fatty acids having 10–14 carbon atoms per molecule of fatty acid, especially from the fats of the lauric acid group, which are particularly rich in fatty acids having 12 carbon atoms. From other fats containing predominantly fatty acids having 16–18 carbon atoms in the molecule, such as vegetable fats other than those mentioned above, tallow, or whale and fish oils, products are obtained which are not as readily soluble at low temperatures, but are entirely usable at temperatures ranging from 50 to 100° C. These fatty acids or their esters, in which, aside from the hydrogen atom in the alpha-position, no sulfonatable groups are to be present, such as double bonds or alcoholic hydroxyl groups, are sulfonated in a manner which is known per se.

Insofar as esters of sulfonated fatty acids are concerned, among the products to be processed according to the invention are those prepared by esterifying one of the above-mentioned crude sulfonated fatty acids with an alcohol. It has proved, however, that brighter-colored products are usually obtained if the bleaching is performed on the sulfonation products of fatty acid esters. These esters can be derived from monovalent or polyvalent alcohols, especially from monovalent to trivalent alcohols which, like the fats used for the sulfonation, do not contain any alcoholic hydroxyl groups or other sulfonatable groups besides the alpha hydrogen. Where the fatty acid esters are produced with primary aliphatic alcohols, these alcohols may contain from 1 to 20 carbon atoms in the molecule. Accordingly, the esters of fatty acids containing methyl, ethyl, propyl, butyl, hexyl, heptyl, octyl, and nonyl alcohols, for example, can be used. Fatty acid esters, which contain residues of still higher alcohols in the molecule may also be used. Some of the easily obtainable fatty acid esters with high fatty alcohols are the hydrogenation products of sperm oil or of the oleyloleate occurring in sperm oil, or natural or synthetic wax esters.

Various methods are known for the conversion of these fatty acids or their derivatives, especially their esters or nitriles, into sulfonic acids, and chlorosulfonic acid. Oleum and sulfur trioxide have been proposed as sulfonating agents to produce the alpha-sulfonic acids. Although the bleaching process of the invention is applicable for the treatment of all of these sulfonic acids, its use for the treatment of products which are obtained by sulfonating the starting fats with gaseous sulfur trioxide, preferably in excess, in the absence of solvents is of special technical interest.

Many fatty acids, especially those of natural origin, and the derivatives produced therefrom, often contain accompanying substances which, during the sulfonation, produce strongly colored decomposition products. Even though it is possible by the invention to bleach even these decomposition products, it is nevertheless recommended not to encumber the bleaching process with the decomposition products of accompanying substances which can be easily be removed, prior to sulfonation, from the fatty acids or fats or from the fatty acid derivatives made from the latter. Some of these products which produce strongly colored impurities with the sulfonating agent are, for example, unsaturated fatty acids or fatty acid derivatives. Therefore, the fatty substances to be processed should be saturated as completely as possible, i.e., they should have iodine numbers lower than 5, and preferably lower than 2. It is preferable in the sulfonation of fatty acids, to start with distillates, and this is also recommended even in the case of fatty acid esters, providing the latter are capable of distillation under the technical conditions involved. In the case of products which, on account of a high boiling point or for other reasons, cannot be distilled without considerable technical expense, as in the case of triglycerides, for example, then it is recommended to first remove any impurities present in the material to be sulfonated. Thus, in the case of natural fats, such as natural triglycerides, materials such as proteins and mucins, should be removed in a manner known per se as, for example, by deacidification and refinement of the oils. These fatty substances, too, are to be saturated as much as possible, so that their iodine number is less than 5 and preferably less than 2.

Sulfonation with gaseous sulfur trioxide is known per se and can be performed in any desired manner. It has proved expedient to pass a current of gas, preferably a current of air, containing sulfur trioxide, through the melted starting material which has not been thinned with solvents.

The bleaching process in accordance with the invention is excellently suited for treating sulfonation products obtained and/or modified according to co-pending application Serial Nos. 194,838 now abandoned; 194,839 now Patent No. 3,251,868; 194,840 now Patent No. 3,256,303; 194,786 issued to Patent 3,158,632, filed the same day as parent application Ser. No. 194,997.

The acid sulfonation products of fatty acids or derivatives which are to be processed according to the invention generally contain excess sulfur trioxide, which may be present in an excess of 0.05 to 1 mol with reference to one mol of fatty acid radical to be sulfonated. Preferably, the excess in this case ranges from 0.1 to 0.7 and particularly from 0.1 to 0.4 mol of sulfonating agent, especially sulfur trioxide.

The products to be bleached according to the invention also include sulfonated fatty acid esters which have been made by esterifying crude sulfonated fatty acid with monovalent or polyvalent alcohols. The esters thus produced also may contain excess sulfonating agent in the amounts stated above.

The above-described sulfonation products are then initially bleached in the manner described in co-pending application Ser. No. 194,998 now Patent No. 3,159,657 or application Ser. No. 194,965 now Patent No. 3,142,691, filed the same day as parent application Ser. No. 194,997.

As described in co-pending application Ser. No. 194,998, the bleaching is effected using hydrogen peroxide either added per se or formed in situ. The hydrogen peroxide is used in amounts of 0.2–6% and preferably 1–4% based on the crude sulfonation products and is preferably used in the form of a commercial aqueous solution containing, for example, 20–75% and most preferably 30–60% by weight of $H_2O_2$.

In order to form the hydrogen peroxide in situ, compounds which will form hydrogen peroxide in the acid sulfonation products at the bleaching temperatures, as for example salts, or organic addition compounds of hydrogen peroxide may be initially added. Examples of the salts of hydrogen peroxide which may be added for this purpose are the peroxides of the alkali or alkaline earth metals such as those of sodium, potassium, magnesium, calcium, strontium, and barium. Examples of the organic addition compounds are those formed by the addition of hydrogen peroxide to urea or hexamethylenetetramine.

These substances are preferably used in the form of aqueous solutions or suspensions containing amounts of water capable of forming the above-mentioned hydrogen peroxide concentrations. These aqueous solutions or suspensions thus may contain, for example, 20 to 80, and preferably 40–60% by weight of the materials.

In place of the hydrogen peroxide, it is also possible to use hypochlorous acid, chlorous acid. These acids may be used as free acids or in the form of their salts or anhydrides. When working with the salts, the excess of sulfonating agent being present in the sulfonated material to be bleached is usually great enough to release the oxidizing acid from the salt so that the bleaching will occur in the presence of sulfonating agent.

These hypochlorous or chlorous acids should be used in amounts equivalent in bleaching effect to 0.2–6% and preferably 1–4% by weight of hydrogen peroxide. When calculating the equivalents, it is necessary to consider the amounts of bleaching oxygen which can be yielded by the oxidants used in each case under the bleaching conditions.

The bleaching agents are preferably added in the form of an aqueous solution or suspension to the crude sulfonation product which is then maintained at the bleaching temperature which may necessitate a temperature adjustment if the product is not already at this temperature. When hydrogen peroxide is used for the bleaching, the same may be added to a cold product, and the temperature allowed to gradually increase. Alternately, the hydrogen peroxide may be added to the warm sulfonation product at a rate calculated to avoid a spontaneous undue temperature rise. The bleaching temperature should be at least 20 degrees C. and the reaction time will depend on the amount of hydrogen peroxide and the temperature. Short reaction times of, for example 2–15 minutes, are generally used at high temperatures of 70–90° C. while reaction times of 15 minutes to 5 hours are used at lower temperatures of for example, 40–70° C. These times are, however, only a general indication, and the bleaching time may be shorter or longer, and may range, for example, from 1 minutes to 75 hours.

Similar bleaching conditions are also used when effecting the bleaching with the hypochlorous or chlorous acids, their salts or anhydrides. In this case, however, the optimum conditions are often dependent upon the form in which the bleach is used. In the case of sodium chlorite, for example, it has been found that the conditions to be maintained for optimum bleaching with solid sodium chlorite are narrower than in the case of aqueous solutions or suspensions of sodium chlorite. For example, if a bleaching time of 60–90 minutes is used with 3% by weight of sodium chlorite, the quality of the bleach and the temperature range of about 40–60° C. is practically independent of whether solid soduim chlorite or an aqueous solution of the same is used. When operating at temperatures under 40 or over 60° C., the bleaching quality is clearly better when it is done in the presence of water.

The starting materials to be bleached may contain water in many cases, and since the hydrogen peroxide serving as the bleach is seldom used in the 100% form, the bleach usually brings greater or lesser amounts of water into the sulfonation product being bleached. It is recommended that the concentration of the hydrogen peroxide to be used as the bleach be such that the sulfuric acid that is formed by the sulfonating agent and the water in the bleach is not more dilute than a 20% sulfuric acid. Indeed, it is possible to bring in very much less water so that the sulfur trioxide is converted to sulfuric acid only to a very slight degree. The water content may be so slight that, mathematically considered, a mixture is created of 95% $SO_3$ and 5% $H_2O$ by weight. Preferably, such amounts of water are used, or such concentrations of hydrogen peroxide, that the sulfur trioxide content of the above-mentioned mixture ranges from 90 down to 50% by weight. The sulfur trioxide content of the mixtures should not amount to less than a value corresponding to the sulfur trioxide content of a 20% sulfuric acid. When products are being processed which were produced using sulfonating agents other than sulfur trioxide, these figures apply to the quantities of $SO_3$ and $H_2O$ computed to be present in the product.

Since sulfonating agents, especially sulfur trioxide and hydrogen peroxide, and water are mixed with the sulfonic acid that is to be bleached, the above-stated concentrations are merely of mathematical significance and are computed on the basis of the excess amount of sulfonating agent, and the amount of water put in at the commencement of the process, disregarding the amount of the sulfonic acid and of any by-products. The amounts of water formed by the hydrogen peroxide during the bleaching are not included in these computations. Operating within the above-stated concentration ranges has the advantage in the case of fatty acid esters that cleavage of the ester bond remains slight and the content of resultant sulfonated fatty acids in the ends product is not harmful in many applications. If the narrower range of concentrations is used, the saponification of the fatty acid esters is practically negligible.

The bleached acid sulfonation products are then neutralized in accordance with the invention. The neutralization may be effected in any manner conventionally used for neutralizing acid sulfonation products, the neutralization is preferably effected using a dilute caustic soda solution but the same may be effected with any inorganic or organic base or basic salt such as the carbonates, or bicarbonates derived from ammonium, sodium, potassium, lithium, magnesium, calcium, barium or strontium, or lower organic amines or alkylol-amines having from 1 to 10 and preferably from 1 to 6 carbon atoms in the molecule. The neutralization should be effected so that at least 75% and preferably 100% of the sulfonic acids present in the sulfonation product are neutralized. Since the product being bleached in most cases contains excess sulfonating agents, unless these agents are also neutralized, the product would be made weakly acid. If this is not desired, the execess sulfonating agent may also be neutralized and the reaction product may even be made alkaline as, for example, to a pH value of 10.5 or preferably 9.

After the neutralzation, the bleaching is continued utilizing for the bleaching, $H_2O_2$, hypochlorous acid or chlorus acid, as bleaching agent. This may be effected by adding further quantities of bleach or initially adding such a quantity of one of the suitable bleaches that active bleaching material remains after the neutralization.

Not all bleaches usable in an acid medium are equally usable for the further bleaching of the neutralized products though the principal bleaches initially used are also applicable to the after-bleaching. These, as noted above, include hydrogen peroxide which again may be added per se or formed in situ, hypochlorous acid, chlorous acid, or their anhydrides or salts.

If hypochlorous acid or its anhydrides or salts are used, then it is preferable to effect the bleaching at relatively low temperatures of between about 10–50 and preferably 15–40 degrees C. If, however, hydrogen peroxide or chlorus acid or anhydrides or salts thereof are used, it is preferable to effect the bleaching at a somewhat elevated temperature ranging between about 50 and 100° C. and most preferably between about 50–80° C.

If the oxidants recommended above for bleaching after the neutralization have also been used in the acid bleaching operation, the neutralization may be performed before all of the bleach has been consumed so that the bleach still present, and the partially bleached neutralized sulfonation product, may continue to exert its bleaching effect after the neutralization.

The initial acid bleaching should in any case preferably be effected until at least the blue component has been reduced to a color value of 5 or below, and preferably less than 1. It is also desirable if the color value of the red component be reduced to a value of 20 or below and preferably 10 or below. These color values all apply to an aqueous solution of the neutralized product of 5% with reference to the acid sulfonation product measured in the Lovibond tintometer in a 4" cell.

If different bleaching agents are used in the two bleaching stages, i.e., before and after neutralization, care must be taken that any bleaching agent still present from the acid bleach after the neutralization will not detrimentally affect the subsequently added bleaching agent for the bleaching stage after the neutralization. Thus, it should be noted that many oxidants consume one another by mutual oxidation or reduction. This is true, for example, of hypochlorous acid and hydrogen peroxide. Thus, if such a pair of oxidants are used, care must be taken that the oxidant used in the first stage is fully used up before the oxidant is added to the second stage or, alternately, the oxidant used in the second stage must be used in a correspondingly greater quantity.

The same amounts of bleach may be used after the neutralization as have been indicated above in connection with the acid bleaching prior to the neutralization. In many cases, however, a substantially better bleaching can be achieved with a given amount of bleach if the operation is effected in the two stages, i.e., prior and after neutralization than in a single stage. This can be achieved if a part of this total quantity is added prior to the neutralization and the remainder after the neutralization or even if the total quantity of the bleaching agent is initially added but is not completely consumed up to the point where the neutralization has been completed.

The post-bleaching time or the time the bleaching is to be effected after the neutralization may vary within wide limits. The minimum bleaching time depends, of course, upon the nature of the starting material, the bleach used, and the bleaching temperature. If hypochlorous acid or its salts or anhydrides are used, the minimum bleaching time at temperatures of 20 to 40° C. is approximately from 30 to 10 minutes, and at temperatures of 10 to 20° C., it is approxiamtely from 60 to 30 minutes. If hydrogen peroxide or materials forming hydrogen peroxide are used, the minimum bleaching time at temperatures of 50 to 80° is in the order of 1 hour. At lower temperatures as low as 10–30° C., times as high as 10–12 hours may be required. Actually, there is no upper limit on the bleaching time and the neutralized sulfonation product may be left with the bleach in it and may, for example, be stored until further processing in this condition.

The sulfonation products treated in accordance with the invention may be esterified with mono-or-polyvalent alcohols, either before or after the bleaching. The esterification may also be performed on the bleached monosalts of the sulfo fatty acids. These treatments by esterification, etc., prior to or after the bleaching, may be effected in the identical manner as described in the said copending applications except that in accordance with the invention after the neutralization of at least 75% of the sulfo groups, a further bleaching must be effected in accordance with the above.

The following examples are given by way of illustration and not limitation:

*Examples 1 and 2*

The crude sulfonation products whose processing is described in these examples were made from a hydrogenated palm nut fatty acid ethyl ester (Iodine number 0.4) by the introduction of gaseous sulfur trioxide, diluted with 20 times the amount of air at 80° C. In the course of 1¼ hours, 1.3 mols of sulfur trioxide were added per mol of fatty acid residue. Thereafter the reaction product was kept for 15 minutes at 80° C. and then cooled to room temperature. The sulfonation product had a sulffur trioxide content of about 7.8 percent by weight.

The oxidants were stirred in, in the quantity stated below, with reference to the weight of the crude sulfonation product, in the form of 40% aqueous solutions or suspensions. The mixture was then heated for the time indicated. Thereafter it was neutralized with 10% caustic soda solution until the sulfonation product was neutralized along with the excess sulfonating agent present therein (pH=7). Then bleach was again added and the mixture was kept for the time indicated at the above-stated temperature. The color values of the neutralized products were measured by means of a Lovibond tintometer in a 4" cell. The concentration of the solutions to be measured was adjusted to 5% by weight, with reference to crude acid sulfonation product.

Since sulfonation products from different production batches were used for the performance of the experiments described in the examples, the results obtained in the various examples are not comparable to one another. Only the values stated within a particular example are comparable to one another, because the starting materials processed were completely identical in this case.

| Example No. | Bleaching Conditions | Color Values | | |
|---|---|---|---|---|
| | | Yellow | Red | Blue |
| 1a | Acid: 1% $H_2O_2$, 1 hr. at 60° C.; Neutral: not bleached | 19 | 3.6 | 0 |
| 1b | Acid: 1% $H_2O_2$, 1 hr. at 60° C.; Neutral: 3% caustic soda solution with 13% active chlorine 5 hr. at 20° C. | 5 | 0.9 | 0 |
| 1c | Acid: 1% $H_2O_2$, 1 hr. at 60° C.; Neutral: 6% caustic soda solution with 13% active chlorine 5 hr. at 20° C. | 4.1 | 0.7 | 0 |
| 1d | Acid: 2% $H_2O_2$, 1 hr. at 60° C.; Neutral: not bleached | 5 | 1.2 | 0 |
| 1e | Acid: not bleached; Neutral: 3% $H_2O_2$, 5 hr. at 80° C. | 27 | 11 | 0.4 |
| 1f | Acid: not bleached; Neutral: 6% caustic soda solution with 13% active chlorine 3 hrs. at 25° C. | 27 | 13.4 | 1.6 |
| 2 | Acid: 1% $H_2O_2$, 1 hr. at 60° C.; Neutral: 1% $H_2O_2$, 5 hr. at 80° C. | 8 | 1.5 | 0 |

*Example 3*

The sulfonation product produced according to the first paragraph of Example 1 was maintained for a period of a few hours in a laboratory apparatus in continuous operation for 1 hr. at 55–60° C. following the addition thereto of 2.5% of its weight in $H_2O_2$. Then the sulfonic acid, and the excess sulfonating agent were neutralized with 10% caustic soda solution. At the time of the neutralization, only 70% of the hydrogen peroxide was consumed; the neutralized sulfonation product was allowed to cool to room temperature. The hydrogen peroxide that had not been consumed by the time of the neutralization continued to exert its bleaching effect. At the time of neutralization and 24 hours after neutralization, the following respective color values were measured: Yellow 9 and 6; red 1.6 and 0.8; blue 0 and 0.

*Example 4*

Hardened (hydrogenated) palm nut fatty acid ethyl ester (Iodine number=0.1) was sulfonated according to the procedure of Example 1. The resulting acid sulfonation product was bleached, using therefor $H_2O_2$ in the form of a 40% aqueous solution in an amount of 1% by weight referred to the acid sulfonation product. The bleaching was carried out at a temperature of 55–60° C. for a period of 30 minutes. Thereafter, the bleached product was divided into three portions.

The first portion was neutralized by the addition of a 10% aqueous soda-lye solution, the neutralized portion having a pH value of 7, following which the neutralized portion was heated in order to decompose any traces of $H_2O_2$ still remaining. There was then added 3% by weight referred to the acid sulfonation product of an aqueous 13% sodium hypochlorite solution, and the resulting mixture heated for 2 hours to 50° C. The color values were determined and found to be as follows:

| | |
|---|---|
| Yellow | 4.0 |
| Red | 0.3 |
| Blue | 0 |

To the second portion of the acid sulfonation product there was added 10% soda-lye in an amount sufficient to neutralize 75% of the sulfonic acid which had been formed. Thereafter, the neutralized mixture was bleached using hypochlorite as the bleaching agent in the same manner as described in connection with the first portion. After bleaching was completed, the resulting solution was adjusted to a pH of 7 and the color values determined and found to be as follows:

| | |
|---|---|
| Yellow | 3.5 |
| Red | 0.2 |
| Blue | 0 |

The third portion was treated with 10% soda-lye in an amount sufficient to produce a pH of 9 and the resulting mixture bleached using hypochlorite and the method described in connection with the first portion. The bleached product was then adjusted using $H_2SO_4$ to a pH of 7. The color values were determined to be as follows:

| | |
|---|---|
| Yellow | 5.0 |
| Red | 0.4 |
| Blue | 0 |

*Example 5*

290 g. hardened tallow oil (stearic) acid methyl ester (Iodine number=0.1) were sulfonated by the procedure disclosed in Example 1, with 112 g. $SO_3$. The acid sulfonation product thereby obtained was bleached by the addition thereto of 2% of its weight of $H_2O_2$ (40% aqueous solution), the bleaching having been carried out for 30 minutes at 60° C. The acid sulfonation product was then divided into three portions, treated with various amounts of 5% soda-lye and the neutralized portions bleached with hypochlorite. The hypochlorite was used in an amount of 7% referred to the acid sulfonation product originally present in each portion of product. Following bleaching, the pH values of the three portions were adjusted to a value of 7. The following color values were determined for each of the three portions:

First portion (neutralized to pH=7)

| | |
|---|---|
| Yellow | 8.0 |
| Red | 0.9 |
| Blue | 0 |

Second portion (75% of the sulfonic acid neutralized)

| | |
|---|---|
| Yellow | 5.0 |
| Red | 0.6 |
| Blue | 0 |

Third portion (adjusted to pH=9)

| | |
|---|---|
| Yellow | 5.0 |
| Red | 0.8 |
| Blue | 0 |

*Example 6*

80 g. sulfur trioxide (1 mol) mixed with a 20-fold volume of air were introduced into 107 g. lauric acid methyl ester (0.5 mol) at 60° C. over a period of 72 minutes. After a period of 20 minutes at 60° C., the reaction mixture was permitted to run slowly into 89 g. (0.48 mol) lauryl alcohol. The temperature of the mixture was maintained at 30–35° C. by external cooling and through regulation of the speed of the addition. The resulting reaction mixture was stirred for a further 15 minutes at 40° C. and the acid reaction product was thereafter divided into three portions.

The first portion was immediately neutralized using therefor 10% soda-lye. The sulfonate had a sulfonation degree of 92%. A 5% solution referred to the acid reaction product had the following color values:

| | |
|---|---|
| Yellow | 18.0 |
| Red | 9.0 |
| Blue | 3.0 |

The second portion was bleached. Following addition of 1 weight % $H_2O_2$ (as an 80% solution; 90 weight % $SO_3$ and 10 weight % $H_2O$) for 10 minutes at a temperature of 60° C., and the bleached product was at once neutralized with 10% soda-lye. The degree of sulfonation of this product amounted to 91.5%; a 5% solution thereof had the following color values:

| | |
|---|---|
| Yellow | 15.0 |
| Red | 3.5 |
| Blue | 0 |

The third portion was bleached, as described for the second portion, using therefor 1% $H_2O_2$, following which the bleached product was neutralized with 10% soda-lye, and thereafter treated with 6% (referred to the weight of the acid reaction product used for the production of the second portion) of a 13% aqueous sodium hypochlorite solution. The bleaching was carried out for 2 hours at a temperature of 55° C. The degree of sulfonation of the neutralized product amounted to 91.8%. A 5% aqueous solution of this product had the following color values:

| | |
|---|---|
| Yellow | 5.0 |
| Red | 0.6 |
| Blue | 0 |

*Example 7*

Hardened (hydrogenated) palm nut fatty acid ethyl ester (Iodine number=0.1) was sulfonated by the method set out in Example 1, at 80° C., within a period of 3 hours and using for the sulfonation 130 mol % $SO_3$. The acid sulfonation product was then divided into three portions and each portion was pre-bleached using 1 weight %, 1.5 weight %, and 2 weight % $H_2O_2$, respectively. The $H_2O_2$ was employed in an amount whereby the product at the beginning of the bleaching contained 55% free $SO_3$ and 45% water. The bleaching was effected for a period of 10 minutes at a temperature of 60° C. Thereafter, the resulting bleached product was neutralized to a pH value of 7, using 10% aqueous soda-lye for the bleaching and briefly heated in order to decompose any traces of $H_2O_2$ remaining.

In the second stage bleaching was carried out with $NaClO_2$ or NaClO as bleaching agent. The NaClO was added as hypochlorite liquor to the pre-bleached and neutralized product. The resulting mixture was cooled to 20° C. and the color values determined 10 minutes thereafter. The $NaClO_2$ was added in the form of its aqueous solution at a temperature of 60° C. The resulting product was maintained for a further 30 minutes at this temperature and the color values determined 30 minutes after the addition of the $NaClO_2$, and again after the product had stood overnight at room temperature. The results obtained are set out in the following table. The color values (shown) are those which were obtained following standing overnight.

TABLE

| Bleaching agent in weight percent referred to the active substance contained in the sulfonation product | | | Color Values | | |
|---|---|---|---|---|---|
| $H_2O_2$ | NaClO | $NaClO_2$ | Yellow | Red | Blue |
| ------- | ------- | ------- | 28 | 25 | 4 |
| 1 | ------- | ------- | 15.0 | 3.4 | --- |
| 1 | 2.1 | ------- | 1.4 | ----- | --- |
| 1 | ------- | 1 | 5.0 (2.4) | 0.1 | --- |
| 1 | ------- | 2 | 6.0 (2.4) | 0.1 | --- |
| 1 | ------- | 3 | 4.0 (2.0) | ---- | --- |
| 1.5 | ------- | ------- | 10.0 | 2 | --- |
| 1.5 | 2.1 | ------- | 1.0 | ---- | --- |
| 1.5 | ------- | 1 | 1.6 (1.4) | ---- | --- |
| 1.5 | ------- | 2 | 1.8 (1.0) | ---- | --- |
| 1.5 | ------- | 3 | 1.8 (0.9) | ---- | --- |
| 2 | ------- | ------- | 4.0 | 0.7 | --- |
| 2 | 2.1 | ------- | 0.5 | ---- | --- |
| 2 | ------- | 1 | 1.8 (1.2) | ---- | --- |
| 2 | ------- | 2 | 1.8 (0.9) | ---- | --- |
| 2 | ------- | 3 | 1.9 (0.8) | ---- | --- |

While the invention has been described with reference to certain specific embodiments, various changes and modifications which fall within the spirit of the invention will become apparent to the skilled artisan.

We claim:

1. In the process for bleaching dark-colored acid sulfonation products obtained by α-sulfonating substantially saturated fatty acids having 6–28 carbon atoms, their esters with alcohols having from 1 to 20 carbon atoms and mixtures thereof with an excess of gaseous sulphur trioxide, the improvement of contacting the dark-colored acid α-sulfonation product with a member selected from the group consisting of hydrogen peroxide, and compounds giving rise to hydrogen peroxide in situ in an amount equivalent to about 0.2–6% by weight of hydrogen peroxide at a temperature between about 20–100° C. in the presence of sufficient added water to dilute the free $SO_3$ to a concentration below 90% but not less than a value corresponding to the sulfur trioxide content of a 20% sulfuric acid until the blue color value in the sulfonation product has been lowered to at least about 5, thereafter neutralizing at least 75% of the sulfo groups in said product, with a member selected from the group consisting of ammonium, alkali metal and alkaline earth metal hydroxides, carbonates and bicarbonates and alkylolamines having from 1 to 10 carbon atoms in their molecules and contacting the substantially neutralized product with a member selected from the group consisting of hydrogen peroxide, chlorous acid, hypochlorous acid, their salts and anhydrides in an amount equivalent to about 0.2–6% by weight of hydrogen peroxide until the product is substantially further lightened.

2. Improvement according to claim 1 in which all of the sulfo groups in said product are neutralized.

3. Improvement according to claim 1 in which said neutralization is effected to a pH value below about 10.5.

4. Improvement according to claim 1 in which the neutralization is effected after the color value of the blue component has been lowered to below 1.

5. Improvement according to claim 1 in which said bleaching is effected with hydrogen peroxide.

6. Improvement according to claim 5 in which said hydrogen peroxide is formed in situ.

7. Improvement according to claim 1 in which said bleaching in said first step is effected with hydrogen peroxide.

8. Improvement according to claim 1 in which said bleaching in said first step is effected with hydrogen peroxide and said bleaching in said second step is effected with NaClO.

9. Improvement according to claim 1 in which said bleaching in said first step is effected with hydrogen peroxide and said bleaching in said second step is effected with $NaClO_2$.

10. Improvement according to claim 5 in which said contacting after said neutralization is effected at a temperature between about 50–100° C.

11. Improvement according to claim 1 in which said bleaching is effected with hypochlorous acid, and in which said contacting after said neutralizing is effected at a temperature between about 10–50° C.

12. Improvement according to claim 1 in which said neutralization is effected prior to the complete consummation of the bleach and in which the bleaching is continued with the residual bleach remaining after the neutralization.

13. Improvement according to claim 1 in which said bleaching in said second bleaching step is effected with an amount of bleach equivalent to 0.2–6% of hydrogen peroxide.

14. Improvement according to claim 1 in which said bleaching in said second bleaching step is effected with an amount of bleach equivalent to 1–4% by weight of hydrogen peroxide.

15. Improvement according to claim 1, in which said bleaching in the second bleaching step is effected with NaClO.

16. Improvement according to claim 1, in which said bleaching in the second bleaching step is effected with $NaClO_2$.

References Cited

UNITED STATES PATENTS

| | | | |
|---|---|---|---|
| 1,734,050 | 11/1929 | Seck | 260—400 |
| 2,846,457 | 8/1958 | Zemlin et al. | 260—400 |
| 2,933,452 | 4/1960 | Byrd | 260—353 |
| 3,167,517 | 1/1965 | Millson et al. | 260—353 |

ALEX MAZEL, *Primary Examiner.*

ANTON H. SUTTO, J. H. TURNIPSEED, *Assistant Examiners.*